United States Patent
Goei (10) Patent No.: US 11,667,208 B1
(45) Date of Patent: Jun. 6, 2023

(54) DISTRIBUTED ON-DEMAND ELEVATED POWER IN LOW POWER INFRASTRUCTURES

(71) Applicant: Power Hero Corp., La Verne, CA (US)

(72) Inventor: Esmond Goei, La Verne, CA (US)

(73) Assignee: Power Hero Corp., La Verne, CA (US)

( * ) Notice: Subject to any disclaimer, the term of this patent is extended or adjusted under 35 U.S.C. 154(b) by 0 days.

(21) Appl. No.: 18/086,175

(22) Filed: Dec. 21, 2022

Related U.S. Application Data (60) Provisional application No. 63/406,018, filed on Sep. 13, 2022.

(51) Int. Cl.
| | |
|---|---|
| *B60L 53/00* | (2019.01) |
| *B60L 53/63* | (2019.01) |
| *B60L 53/53* | (2019.01) |
| *B60L 53/16* | (2019.01) |
| *H02J 7/00* | (2006.01) |
| *B60L 53/30* | (2019.01) |

(52) U.S. Cl.
CPC ............. *B60L 53/63* (2019.02); *B60L 53/16* (2019.02); *B60L 53/305* (2019.02); *B60L 53/53* (2019.02); *H02J 7/0029* (2013.01); *H02J 7/0048* (2020.01); *H02J 7/00714* (2020.01); *H02J 2207/20* (2020.01); *H02J 2207/40* (2020.01)

(58) Field of Classification Search
CPC ........ B60L 53/63; B60L 53/16; B60L 53/305; B60L 53/53; H02J 7/0029; H02J 7/0048; H02J 7/00714; H02J 2207/20; H02J 2207/40
See application file for complete search history.

(56) References Cited

U.S. PATENT DOCUMENTS

| | | | | |
|---|---|---|---|---|
| 8,624,719 | B2* | 1/2014 | Klose | B60L 53/68 340/439 |
| 9,960,637 | B2* | 5/2018 | Sanders | G05B 15/02 |
| 10,759,287 | B2* | 9/2020 | Vahedi | B60L 53/11 |
| 10,906,423 | B2* | 2/2021 | Bridges | B60L 53/52 |
| 10,967,738 | B1* | 4/2021 | Appelbaum | B60L 53/16 |
| 11,117,487 | B2* | 9/2021 | Al-Awami | B60L 53/62 |
| 11,171,509 | B2* | 11/2021 | Lee | B60L 53/305 |
| 2020/0031238 | A1* | 1/2020 | Kydd | H02J 9/062 |
| 2021/0170902 | A1* | 6/2021 | Tsuchiya | B60L 53/62 |

(Continued)

FOREIGN PATENT DOCUMENTS

| | | | |
|---|---|---|---|
| EP | 4112362 A1 * | 1/2023 | |
| WO | WO-2018098400 A1 * | 5/2018 | |

*Primary Examiner* — Naum Levin (57) ABSTRACT

An apparatus for implementing a power distribution system for electric vehicles charging within a structure that includes a battery for storing electrical energy. A power node module connects to an electrical grid of the structure at a preexisting load point to receive an electric current at a first power level. The power node module charges the battery responsive to the received electric current at the first power level and generates a charging current at a second power level for charging a connected electric vehicle using the stored electrical energy of the battery responsive to a received charging control signal. At least one charger connector connected to the power node module connects the connected electric vehicle to receive the charging current.

28 Claims, 9 Drawing Sheets

(56) References Cited

U.S. PATENT DOCUMENTS

| | | | |
|---|---|---|---|
| 2021/0370795 A1* | 12/2021 | Kydd | B60L 53/60 |
| 2022/0072973 A1* | 3/2022 | Tsuchiya | B60L 53/14 |
| 2022/0085612 A1* | 3/2022 | Horii | B60L 53/63 |
| 2022/0111747 A1* | 4/2022 | Goei | B60L 53/66 |
| 2023/0011000 A1* | 1/2023 | Zhou | B60L 53/67 |
| 2023/0087598 A1* | 3/2023 | Lamer | H01M 50/514 |

* cited by examiner

DISTRIBUTED ON-DEMAND ELEVATED POWER IN LOW POWER INFRASTRUCTURES

CROSS-REFERENCE TO RELATED APPLICATIONS

This application claims the benefit of U.S. Provisional Application No. 63/406,018, filed on Sep. 13, 2022, entitled DISTRIBUTED ON-DEMAND ELEVATED POWER IN LOW POWER INFRASTRUCTURES, which is incorporated by reference in its entirety.

TECHNICAL FIELD

The present invention relates to charging infrastructures for electric vehicles, and more particularly, to a method for improving charging infrastructure for multi-unit residential buildings such as apartment buildings.

BACKGROUND

One issue associated with the increased popularity of electric vehicles (EVs) is the infrastructure available for providing charging services to the electric vehicles. The majority of multi-unit residential buildings (MURBs) in the world were built before the advent of modern-day electric vehicles and are not structurally designed or equipped to provide adequate charging power and power outlets for the charging of electric vehicles. In North America, for example, most normal regular household power lines are typically 110 V to 120 V circuits which only provides very slow charging for electric vehicles. On the other hand, electric vehicle owners that live in detached houses or structures with adjacent or attached above ground parking garages or carports can install a private-use 240 V EV charger (so-called level 2 or "L2" charger) from the house's power distribution panel that can fully charge an electric vehicle in just a few hours.

Such home garage charger installations are relatively inexpensive compared to installing an L2 charger in a MURB which likely do not even have 120 V outlets distributed throughout the indoor parking garage or outdoor parking areas. Such MURBs that pre-date electric vehicles do not have 240 V power lines and outlets in their garages for charging electric vehicles let alone distributed 120 V outlets. Thus, such MURBs will likely need to construct and lay new power lines within the structure that can handle the amperage and voltages of level 2 electric vehicle chargers from a structure's power distribution panel to specific distributed power points or outlets. In some cases, the MURB may not even have sufficient power at the distribution panel for distribution which would require the local electricity utility company to run additional power lines from a substation to the MURB, often at the MURB owner's expense. Thus, there is a need with respect to older MURBs, that were constructed prior to the advent of present day EVs, to be able to utilize existing low power electrical infrastructures and yet provide higher power L2 charging for electric vehicles on premise.

SUMMARY

The present invention, as disclosed and described herein, in one aspect thereof comprises an apparatus for implementing a power distribution system for charging electric vehicles (EVs) that includes battery modules for storing electrical energy. A power node module connects to an electricity grid at a preexisting load point to receive an electric current at a first power level. The power node module charges the battery responsive to the received electric current at the first power level and generates a charging current at a second power level for charging a connected electric vehicle using the stored electrical energy of the battery module responsive to a received charging control signal. At least one charger connector connected to the power node module connects the connected electric vehicle to receive the charging current.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of a system and method for providing distributed on-demand elevated power in low power infrastructures are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
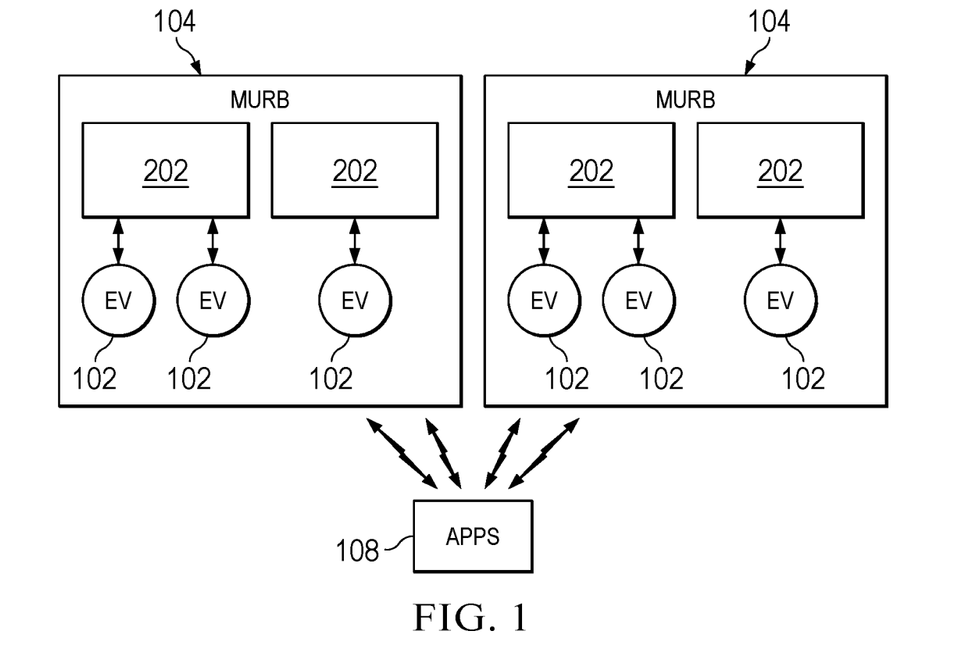
FIG. 1 illustrates a general operating environment wherein multiple electric vehicles utilizing apps may receive charging from power node modules within different MURBs.

FIG. 1 illustrates the operating environment for a variety of electric vehicles 102 that may be charged within different multi-unit residential buildings (MURBs) 104. Each of the MURBs 104 include one or more power node modules 202. The power node modules 202 connect either directly to the MURBs 104 power panel as individual power node modules or as a network or group of modules that are managed through connection with a master controller PMC 302 so as to receive power from the grid and to distribute power to the connected electric vehicles (EVs) 102. The user/driver of the electric vehicles 102 may control the charging process through associated software apps 108 for which they subscribe. Upon subscribing for the app 108 the user/driver will be eligible to use one or more designated power node modules 202 to charge their EV. The MURB building management 316 will normally be responsible to set usage protocols and assign parking stalls relative to specific power node modules. Once registered as a subscriber the user/driver may activate their app 108 through connection with PowerNet 312 and set their user profile along with details of the designated EV that will be using the power node module, their personal particulars such as the MURB unit number in which they reside, the preferred payment account for assessing charging fees, expected charging times, etc. The plurality of power node modules are each individually chargeable in different charging configurations based on a user profile of a user associated with the power node module. When the user/driver is ready to charge their EV at the designated parking stall they will activate their app 108 and initiate a charging session and track the charging of their electric vehicle 102 remotely via their app 108. The system of FIG. 1 provides a design and methodology for creating and managing distributed pools of stored electricity during periods of low or no demand at a rate that is compatible with the MURBs 104 existing electricity distribution infrastructure, for example, 120 V at 20 A. The stored electricity can then be made available to the tenants' electric vehicles 102 of the specific MURB 104 and dispensed at a variable and/or higher rate of discharge in line with typical level 2 (L2) chargers. Such dispensation may be scheduled for specific times as demanded or scheduled at available times by the owners of the EVs 102 that subscribe for Multi-Unit Residential Power (MURP system (300)—FIG. 3) service to charge their EVs for specific periods at a higher rate than would have been possible had the EV been merely connected to a regular household 120 V outlet. Thus, rather than requiring all night to charge their electric vehicle 102 at 120V, only a few hours at an L2 charging rate at a power node module 202 charging unit is needed. The EV owners may subscribe for such service via a smart device software app 108 that communicates with the MURP system 300 through PowerNet 312 (FIG. 3) to schedule charging times. The PowerNet 312 may be that described in associated U.S. patent application Ser. No. 17/533,706, filed Nov. 23, 2021, entitled "METHODS AND DEVICES FOR WIRELESS AND LOCAL CONTROL OF THE TWO-WAY FLOW OF ELECTRICAL POWER BETWEEN ELECTRIC VEHICLES, BETWEEN EVS AND ELECTRICAL VEHICLE SUPPLY EQUIPMENT(S), AND BETWEEN THE EVSE(S) AND THE ELECTRICITY GRID", which is incorporated herein by reference in its entirety. The PowerNet 312, which incorporates a control center 313 and artificial intelligence 311, enables remote control of the various power node modules 202 over a network such as the Internet.

Figure 2:
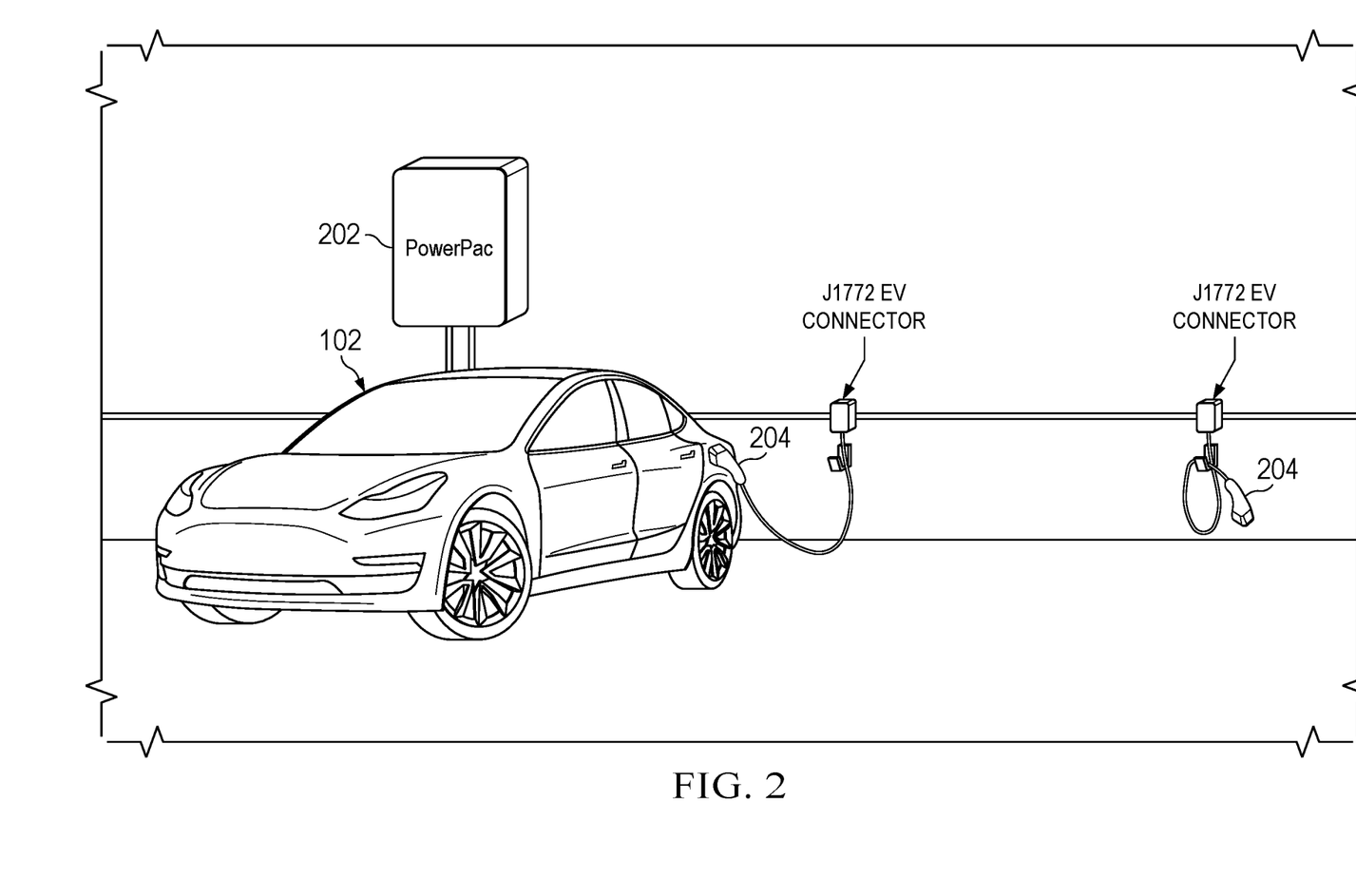
FIG. 2 illustrates a wall-mounted power node module including the multiple electric vehicle connectors.

Referring now to FIG. 2, there is illustrated a wall-mounted power node module 202 including multiple electric vehicle power connectors 204. The power node module 202 is shown as interconnected with the electrical power system of a MURB structure such as an apartment building but such an implementation is not restricted to a MURB or any specific structure. Each power node module 202 includes one or more electric vehicle connectors 204 which may interconnect with an electric vehicle 102 for charging purposes. The power node module 202 depicted is a wall-mounted unit configured with enough battery capacity to service two electric vehicles 102 simultaneously but is not limited to just two vehicles. In some cases, the power node module 202 can be mounted on the ceiling of the parking area, a pedestal at an appropriate location, or on a structural column as necessitated by a MURB's infrastructure. The power node module 202 is particularly applicable for implementation within MURB structures that predate the introduction of electric vehicles 102 or such MURBs that do not have an existing power distribution infrastructure to support any load that requires more than a 120 V circuit. However, the system may also apply to any application whereby energy is stored in association with some type of power node module 202 for later distribution, or where low power is elevated to a higher power for dispensation such as for charging an electric vehicle. While wall mounted power node modules 202 are illustrated in the drawings and description herein, the power node modules may also be portable to allow their transport and use as a mobile charger in accordance with the configuration of the power node modules described herein. In alternative embodiments, the power node module 202 may be plugged into a NEMA 1-15 or 1-20 household wall socket and used to generate 240V AC power within a home for charging an EV.

Figure 3:
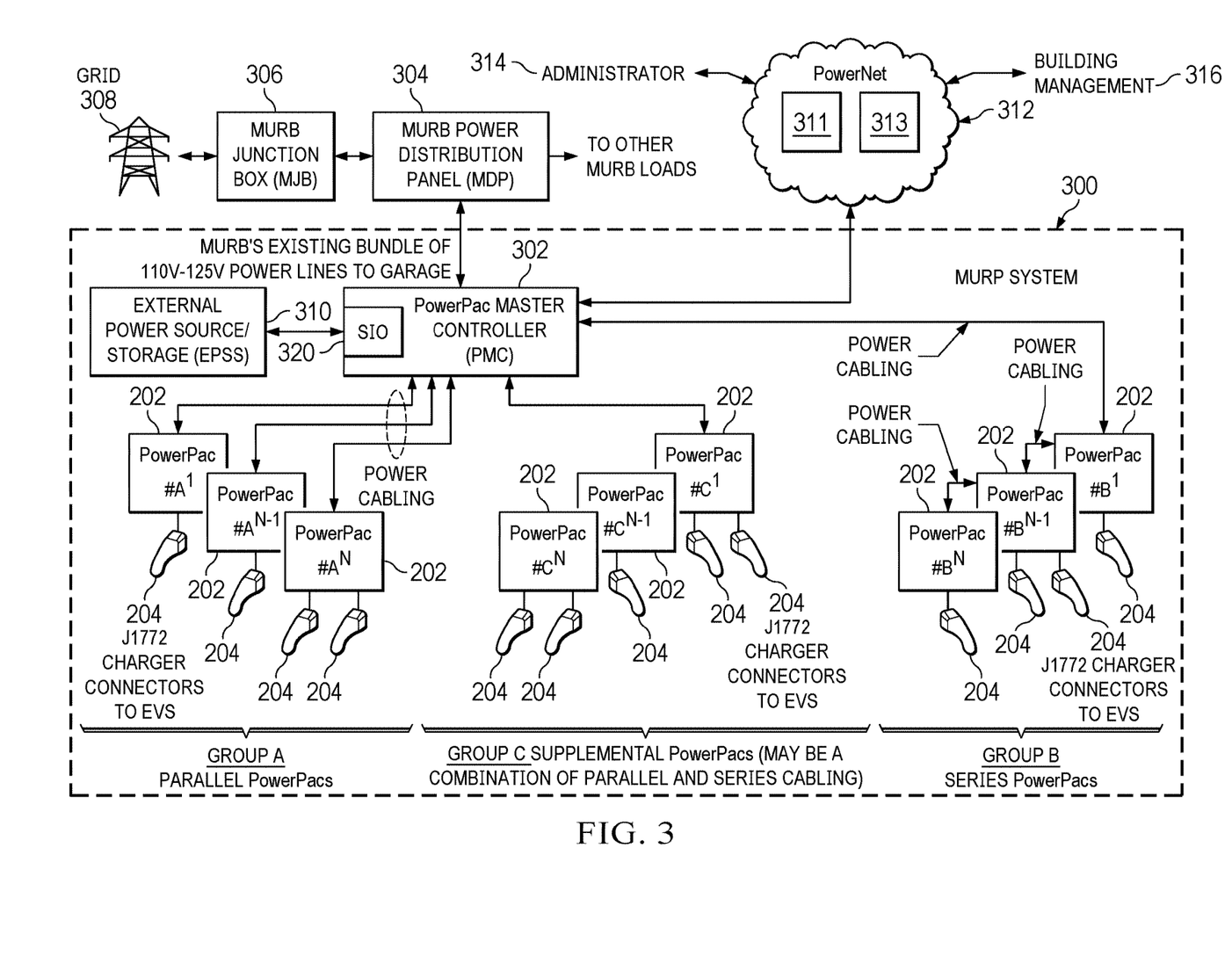
FIG. 3 illustrates a distributed charging system.
Figure 6:
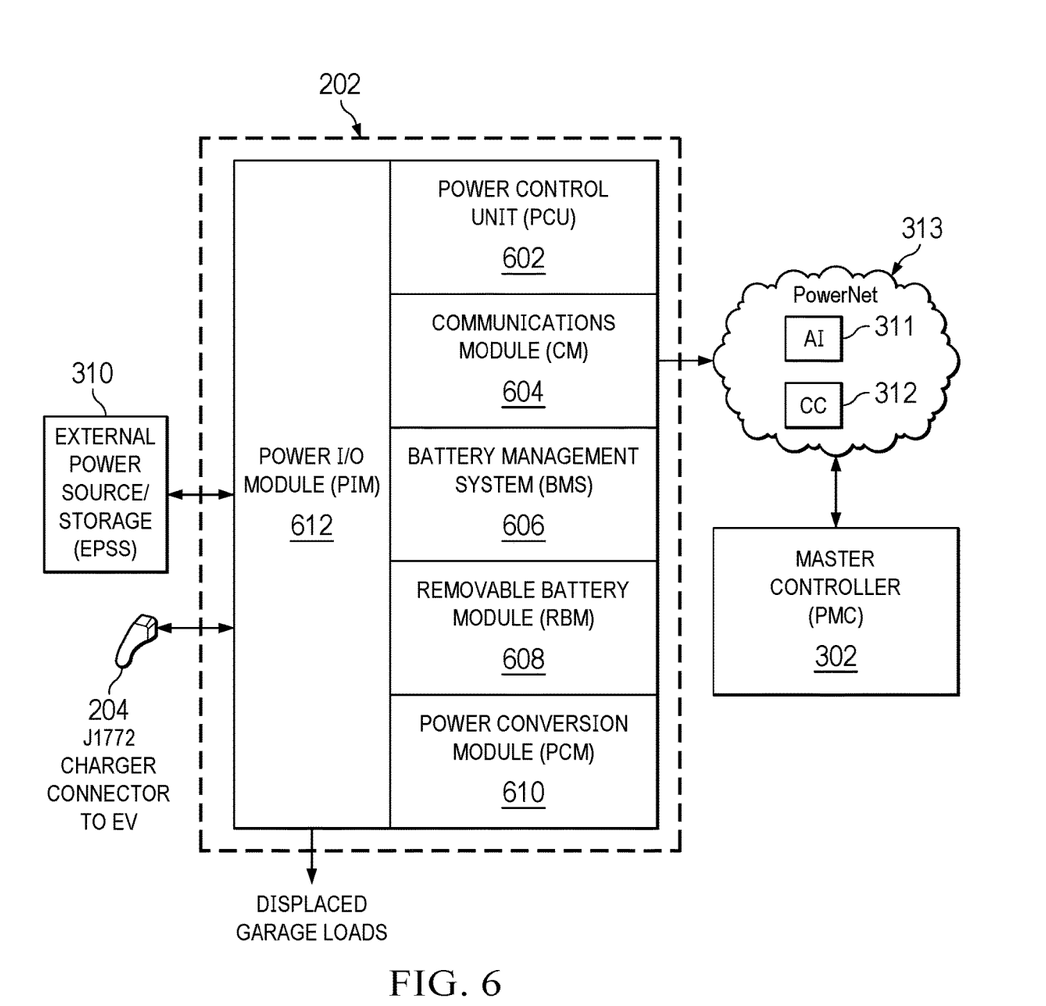
FIG. 6 illustrates a block diagram of a power node module.

Referring now to FIG. 3, there is illustrated a distributed charging system that implements a plurality of power node modules 202 as described herein. Each of the power node modules 202 are provisioned with an electric vehicle charging connector 204. In one embodiment, the charging connector 204 may comprise a J1772 charger connector. However other types of charger connectors may be utilized in conjunction with different charging protocols. Each of the power node modules 202 communicate with a power node module master controller (PMC) 302. The PMC 302 provides for interconnection between the power node modules 202 and the MURB power distribution panel 304. The power distribution panel 304 receives system power through the MURB junction box 306 which is connected to the associated power grid 308. The PMC 302 can also receive power through an external power source/storage unit 310 as can each of the power node module 202 receive power via its associated power I/O module 612 (FIG. 6). The external source/storage unit 310 may generate a variety of charging power ranging from 120V AC (Level 1 power), 240V AC (Level 2 power) and Level 3 DC power which is commonly referred to as a "fast charger". It will be appreciated by one skilled in the art that the 120V and 240V listed above are merely examples and any charge voltage level be utilized. If the existing available first power level source is insufficient to satisfy the overall power demand of the premise that has installed the power node module or modules (MURP system 300), the power source/storage 310 can be provisioned as a permanent device to supplement the existing first power level source. Such a source device could be a clean energy hydrogen powered generator. In addition, each of the power node module 202 can also be "fast charged" with direct current at a Level 3 standard through its power I/O module 612. Control of the power node master controller is provided through PowerNet 312. The control of various power node master 302 controllers through the PowerNet 312 enables a hierarchy of individual power node modules 202 to be grouped to make a MURP 300, then multiple MURPs to be grouped in a MURB 104, then several MURBs grouped together, then MURB groups into regional groups, then regional groups into national groups, and then nation groups into global groups that are all interconnected via the public grid.

The power grid 308 delivers electricity into the multi-unit residential power (MURP) system 300 through the MURB junction box 306. Each MURP system 300 consists of one or more power node modules 202. Each MURB may have more than one MURP system 300 depending on the MURB's construction, wiring infrastructure and parking locations. The MURB junction box 306 is connected to the MURB's internal power distribution panel 304. The power distribution panel 304 provides for further distribution to loads throughout the MURB such as lighting in the parking garage and power outlets such as standard NEMA 1-15, 1-20, 5-20 outlets and the power node modules 202. The power flows from the power grid 308 through to the power node modules 202 are depicted as bidirectional at specific points to denote that the power node modules 202 may be equipped with two-way power flow control mechanisms to extract stored power in the power node modules 202 or external power storage device 310 to provide backup power to the MURB's other loads. Conversely, the power node modules 202 may be used to dispense power to one or more external storage devices 310.

The MURP system 300 requires the insertion of a power node master controller 302 between the power distribution panel 304 and existing loads in the garage such as lighting points and electrical outlets. These all comprise load points for the system. The power node master controller 302 may be accessed by the PowerNet administrator 314 through the Internet for inquiries as to the state of each power node module 202 in a specific application in a specific MURB installation, or to manage the power node modules 202. The local building management 316 may also be given restricted access to the MURP system 300 through PowerNet 312. Each power node master controller 302 for a specific MURB can provide backup administration of the power node modules 202 in that MURB for a specific duration when PowerNet 312 is off-line for any reason.

Figure 4:
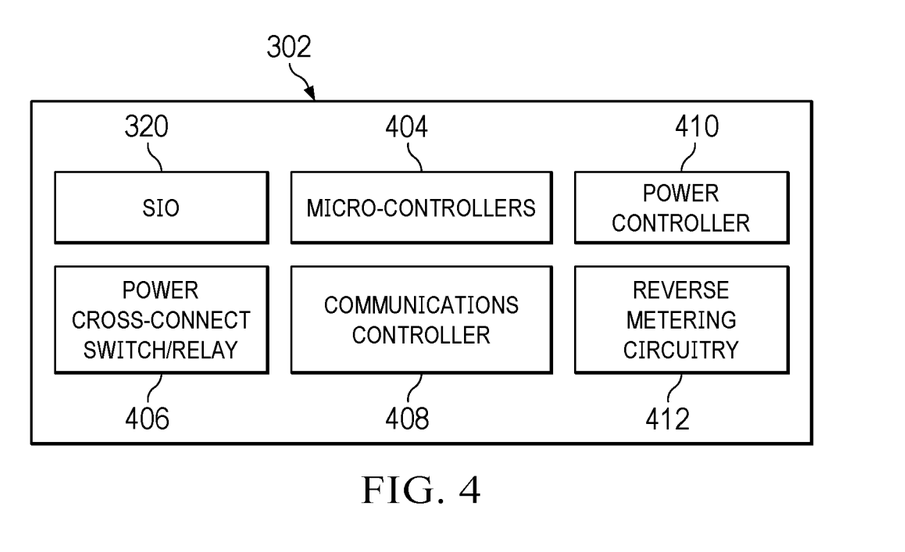
FIG. 4 illustrates a block diagram of a power node master controller.

The various load points connected to the MURP system 300 can be connected in series or parallel. Within a parallel connection, the voltage across the loads is the same. A power node module 202 is electrically connected to external load points and draws power from the power node master controller 302 to charge a battery module 608 located within the power node module 202 as illustrated in FIG. 6. The power node master controller 302 contains microcontrollers/microcomputers 404, power cross-connect switches and/or relays 406, a communications controller 408, a power controller 410 and reverse metering circuitry 412. Power node master controller 302 manages a plurality of power node modules 202 within a specific MURP system 300 in conjunction with the control center 313 and artificial intelligence unit (AI) 311 incorporated in PowerNet 312 (FIG. 3). Through the control of PowerNet 312, several distributed MURP systems 300 that are inter-connected on connectable electrical grids can share power with one another and also aggregate their power as may be required. Charging of the associated battery module within the power node module 202 is under the control of the power control unit 602 in conjunction with battery management system 606. The microcontrollers/microcomputers control operations within the power node master controller 302. The power cross-connect switches/relays 406 and 704 provide for cross connections between different power points across the MURP system 300, with other MURP systems on the same logical grouping or MURB campus and with external devices. The communications controller 408 enables communications with PowerNet 312 using the Internet for example. The PowerNet 312 with control center 313 and AI 311 is the overall cloud system that controls the plurality of MURP systems 300. The communications controller 408 communicates over the Internet using various data communications medium such as cellular (3G/4G/5G or other current standard), satellite and Bluetooth links. The power controller 410 in conjunction with the micro-controllers and the power cross-connect switch/relay 406 manages the translation of power entering the MURP system 300 from either the MURB power distribution panel 304 or the external source 310 which can range from AC to very high voltage DC such as from a DC Fast Charger (DCFC). The SIO 320 is provisioned to accept various connectors and power that are normally used by charging equipment for charging EVs such as J1772 if the charging equipment is a Level 2 charger as is commonly used in North America and for a DCFC the SIO 320 may be provisioned to accept charging according to the CHAdeMO standard, the Combined Charging System (CCS) standard, or Tesla's proprietary fast charger standard. Depending on the provisioning of the power node module's power I/O module 612, the power that flows through from the power master controller 302 could also range from 120V AC to high voltage DC. Similarly, the individual Power I/O module 612 in the individual power node module can be provisioned to accept AC and DC power connections similar to the SIO 320 in the power master controller 302.

The battery module 608 within the power node module 202 as exemplified herewith amasses or collects energy that has essentially been transferred to the battery module at times when there is little or no load on the associated power node module 202. The power node module also enables MURBs to create EV charging stalls in spaces that have no direct grid power points on site. Thus the embodiment of the power node module enables time/space displacement of energy to provide power to devices that have no direct or convenient access to grid power such as an electric vehicle in a MURB that does not even have low power 120V circuits in their parking areas. Further, the power node module 202 provides the opportunity of simultaneously displacing existing inefficient loads such as incandescent lighting with low power lighting loads such as LEDs while using the power saved to provide accumulated elevated power in defined time segments. The battery charging functionality to charge the power node module's battery module 608 is incorporated in the battery management system 606 which is shown situated within the power node module 202 itself but a different embodiment may place the battery management system 606 externally to provide charge management for a plurality of power node battery modules 608. The power node master controller 302 controls a plurality of power node modules 202 within a MURP system 300. Each MURP system 300 has its own power node master controller 302 which may draw power from individual power node module 202 or the plurality of power node modules 202 within the specific MURP system 300. The master controller 302 also manages the exchange of power with other different MURP systems 300 that are connected to the national or international power grids 308 which are controlled through PowerNet 312. If the MURB administrators elect to sell power stored within its power node modules 202 back to the power grid 308, reverse metering circuitry 412 would be required for reverse metering and interconnecting with the power grid 308 at the junction box 306 and/or at the grid substation where power is drawn from the grid and wired to the MURB. It is noted that in an application wherein only one power node module 202 is required such as in the case of a single detached home, the reverse metering circuitry 412 would be incorporated into the power node module 202 itself. An EV owner/driver living in a detached home on landed property which has limited power should welcome having access to a single standalone power node module that they can simply plug into an ordinary household outlet such as a 120V AC NEMA 1-20 socket and generate on premise Level 2 power to charge their EV.

Figure 5:
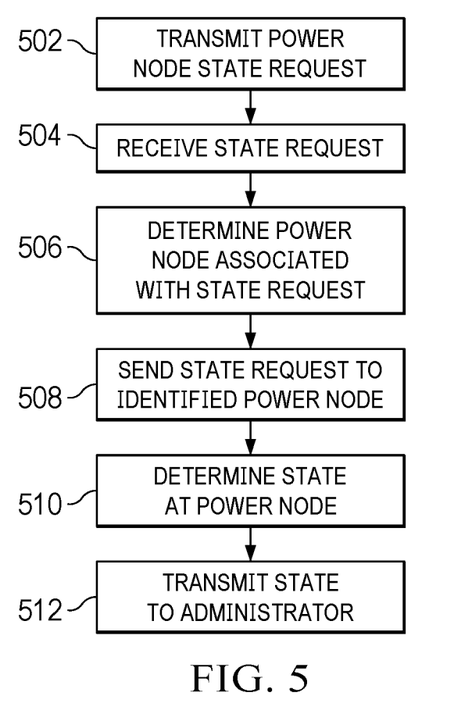
FIG. 5 illustrates a basic flow diagram of the process for transmitting power node state information to a cloud resident control center and/or a system administrator.

The administrator 314 or the building management 316 in FIG. 3 may make various inquiries through PowerNet 312 as to the state of each power node module 202 within a MURB structure. For ease of illustration PowerNet 312 includes both the communications medium that connects with the various deployed MURP system 300 and the control center that manages the plurality of MURP systems 300. The PowerNet 312 can transmit a power node state request to determine the state of the power node module 202 at step 502. The power mode master controller 302 receives the power node module state request at step 504 and determines at step 506 the particular power node 202 associated with the state request. The power node master controller 302 sends a state request to the identified power node module 202 at step 508. Responsive to the received state request the power node module 202 determines at step 510 the state of the power node module and transmits the determined state response at step 512 back to the administrator 314 through the power node master controller 302 and PowerNet 312. Alternatively, each power node 202 can be programmed to report its status to PowerNet 312 at regular scheduled intervals or whenever an anomaly occurs.

Whereas FIG. 5 demonstrates a simple state inquiry, control center 313 in conjunction with artificial intelligence 311 performs many more complex and varied transactions that may be programmed and customized for each implementation of a MURP system 300. Some typical transactions and tasks would encompass monitoring and recording EV charging activity of a specific MURP system 300 and executing control to distribute and balance stored energy within the power node modules 202 of the MURP system 300. It should be noted that EV drivers have different EV usage characteristics due to commute distances, driving terrain and even work shifts so their residual EV battery levels at the end of their workday will be different from one driver to another. Thus, each EV that is connected to a MURP system 300 will likely need different amounts of charge restoration for their EV's battery. PowerNet 312 enables customization of power node modules 202 to suit different MURB conditions and requirements. In addition, the power node modules 202 may be configured with multiple power input points at the power I/O module 612 that can be switched to allow for greater aggregated charging rates.

Referring now back to FIG. 3, there are illustrated a plurality of power node modules 202 associated with groups A, B and C. Groups A and B are located in dedicated parking stalls while group C power node modules 202 are located in stalls that are open for use by any electric vehicle driver on a shared and reserved basis. Group A power node modules 202 depict a set of power node modules that are connected in parallel to the power node master controller 302. Group B power modules 202 are a set of power node modules that are connected in series to the power node master controller 302. Group C power node modules 302 are a set of power node modules that are designated specifically for use by any subscriber on a reservation basis and may be connected to the power node master controller 302 either in series or in parallel. The application described herein as an example depicts the use of the power node modules 202 for charging electric vehicles, more specifically as level 2 chargers, which in North America dispenses 240 V AC power at current amperage between 30 A and 80 A today. Thus, the power node module 202 could take in power at a first lower voltage (i.e. 120 V) and output a higher voltage (i.e. 240 V). The higher the product of voltage and current that is desired at the output of the power node module 202, the greater the capacity of the power node module's battery module that is required. Also, the greater the product of voltage and current, the longer it takes to fully charge the power node module's battery module 608. Such increased battery capacity would allow dispensing power to more than one electric vehicle at a time as depicted in FIG. 3 where some power node modules 202 are equipped with more than one J1772 power connector 204.

The implementation depicted in FIG. 3 is that for a covered garage complex of a MURB wherein there already exist power cabling throughout the garage complex that terminates at power sockets such as NEMA 1-15, NEMA 1-20, etc. or at light fixtures that provide illumination in the garage complex. Such existing building loads are likely connected to the same power distribution panel 304. The system may also be implemented in open parking areas where the power node modules 202 may be installed on pedestals that are secured to the ground. In such open spaces there may not even be power service to the power node modules 202 wherein the recharging of the power node modules 202 may be accomplished by bringing mobile charging power to the site and injecting power through the PIM module 612 ports of the power node modules 202. The existing power cabling that delivers power to the building loads that are in the garage complex may be commandeered and used for delivering power to the power node modules 202 that are installed for the MURP system 300. This eliminates the need to install new wiring to feed the power node modules 202 to be installed in the garage complex. To maintain continuity in the provision of power to existing loads in the garage complex, such loads would be incorporated under the control of the power control unit PCU 602 of the respective power node module 202 that commandeered the loads' cabling.

While the primary utility of the MURP system 300 is to use existing power sources to charge groups of power node modules 202 throughout a garage complex, occasionally such existing power sources may not be sufficient. In such situations, the power node modules may be charged by an external power source 310 such as a mobile power generator that connects to the power node master controller 302 via the supplemental input/output port (SIO) 320 or via the PIM 612 module of the individual power node module 202. SIO 320 and the PIM 612 may receive and transmit power in several modes such as through a direct connection via connectors or wirelessly through induction. The connecting lines depicted in FIG. 3 is shown to be two-way so as to illustrate the reversible flow of power from the power node modules 202 to provide power to external loads, wherein the power node modules would then be used as a power generator as may be needed, or in reverse wherein the power node module receives power from an external source for recharging its own internal battery module 608. Power node modules 202 may also exchange power with each other as necessary under the control of their respective power control units 602 in conjunction with PowerNet 312.

Figure 7:
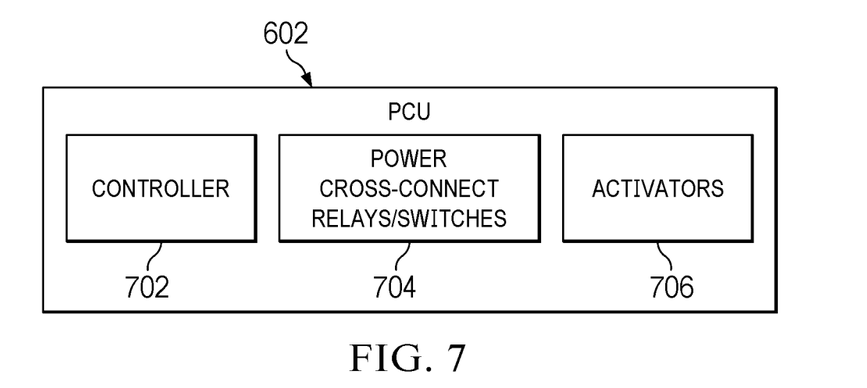
FIG. 7 illustrates a block diagram of a power control unit.

Referring now to FIG. 6, there is illustrated a block diagram of a power node module 202. The power node module 202 includes a power control unit 602, communications module 604, battery management system 606, a removable battery module 608, a power conversion module 610 and power input output module 612. The power I/O module 612 provides the point of interface between a power node module 202 and the power node master controller 302 (FIG. 3). In conjunction with the power node master controller 302, the power control unit 602 in each power node module 202 controls the flow of power between the individual power node modules 202 (inter-power node connection) and the power flows between a power node module and the power node master controller 302 and between the power node module and an external power source/storage 310. In addition, the power control unit 602 provides either active or passive power to existing loads that preexisted on the cabling that now serves to power the power node modules 202 that commandeered the existing cabling. As shown more particularly in FIG. 7, the power control unit 602 contains electronics including a controller 702 for controlling the operation of the power control unit, power cross-connects and/or relays 704 and actuators 706 that direct and control the flow of power in and out of the host power node module 202. It is anticipated that the installation of power node modules 202 will result in utilizing the installation events to replace inefficient lighting loads such as incandescent lighting with energy efficient LED lights which would allow much greater power to be distributed to the power node modules 202 and accelerate the recharging of the battery modules 608 in the associated power node modules 202. Other load reduction techniques may be deployed to maximize the available power for the recharging of the power node modules 202. Such recharging is continuously monitored and controlled by the power node master controller 302 and power control unit 602 working in concert and constrained to the capacity of the existing cabling infrastructure in the MURB. This negates and minimizes the need for new cabling within the MURB and also ensures that the stored power capacity of the MURP systems 300 are not over-provisioned which would unnecessarily increase system cost.

The communications module 604 controls communications throughout the specific MURP system 300, between the individual power node modules 202, with other MURP systems 300 and with control center 313 in PowerNet 312, or locally within the MURB using the Internet and communications medium and protocols such as cellular, satellite, WiFi, or Bluetooth. The communications module 604 enables the administrator 314 and the MURBs building management 316 to control the individual power node modules 202 as may be appropriate and configured. The PowerNet system 312 manages the overall operation of the plurality of MURP systems 300 running in MURBs everywhere, and collects operating statistics such as system usage profiles, user charging habits, and battery levels throughout the day across the system. Such data will enable the system administrator to optimize system operation and with the help of artificial intelligence unit 311 incorporated in PowerNet 312 be able to automate system responses such as the allocation and diversion of stored energy in battery modules 608 across the specific MURP system 300 and other grid connected systems, and eliminate charging bottlenecks and inefficiencies locally and regionally. Such operating protocols can be applied throughout a MURP system 300 and broaden across several MURP systems 300 interconnected through the public grid.

Batteries are constructed of a variety of cells that differ in chemical composition and physical characteristics and necessitates the use of a battery management system (BMS) 606 to regulate the charging of the battery cell packs from being exposed to detrimental conditions such as over-voltage, under-voltage, over-current and high temperature variations to name a few. Several cell packs make up a battery module 608 which may be designed with the BMS integrated with the cell packs or kept separate from the cell packs so as to reduce the cost of the battery module 608. FIG. 6 displays an embodiment where the BMS 606 is kept separate from the battery module 608. The battery management system BMS 606 has overriding control on the charging of the battery module 608 to prevent any dangerous incidents of combustion or explosion. Thus, the BMS 606 both monitors the conditions of the battery cell packs to prevent overcharging and to monitor the operational state and charge level of the battery cell packs and also provides the necessary charging current and voltage to the battery module 608. The battery module 608 in the power node module 202 may be designed to be removable or fixed depending on the specific application, user expectations, economics and the expected life of the installation where the power node module 202 is installed. As such the power node module is designed to be provisioned with one or more battery modules 608 which enables the power node module to be provisioned to different charge capacity according to the needs of the specific user assigned to the specific power node module.

The external power source/storage 310 connects with the power node module 202 via the power input/output module 612 to provide for the individual recharging of a power node module 202 from an external source if the battery module 608 cannot be fully charged by the MURP system 300 and needs to be supplementally charged from an external source 310 at unscheduled times. Unlike the power node master controller 302 of FIG. 3, the power input/output module 612 handles both the dispensation of power to the electric vehicles and to the external power source/storage 310 (without a SIO 320) as the individual power transfer from one power node module 202 is much less than the power transfer between the power node master controller 302 and an external power source/storage 310. The power conversion module 610 in the power node module 202 converts the power from the power node master controller 302 or external source 310 into either AC or DC power depending upon the load requirements. For example, an electric vehicle in the configuration presented, wherein the flow-through power coming from the power distribution panel 304 is 120 V AC, the power that is dispensed to the electric vehicle would be a 240 V AC power, but for an LED lighting load, the power from the power distribution panel 304 would have to be converted to DC by the power node module 202. The power conversion module 610 may also be located externally to the battery and removably connectable. The power conversion module 610 may also include an output power inverter that is both externally and removably connected to the battery.

Referring now back to FIG. 3, each power node module 202 is depicted for the charging of electric vehicles and may be reserved for specific days and times by users that have subscribed for usage rights to the MURBs power node modules 202 for the charging of the user's electric vehicle. Such reservation protocols and privileges and power node module 202 assignments may be set through PowerNet 312 by the MURB manager or designated personnel. The adherence to protocols and charging behavior are subject to monitoring by the power control unit 602 of each power node module 202 and reported to PowerNet 312. If an electric vehicle user violates protocols such as exceeding the allowed charging time and impacts the use of a stall's assigned power node module 202 by others, the violator may be penalized by the suspension of their charging privileges, and possibly towing of their electric vehicle so as to vacate the stall. In response to such overstay situations, the power node master controller 302 of the local MURB will act to divert subsequent reserved users to other available power node module 202 stalls. MURBs management 316 may also opt to assign specific stalls to specific MURP system 300 subscribers on a fixed term basis which may alleviate and/or prevent such instances of charging contentions. Power node modules 202 may be mounted near a specific parking stall such as overhead on the ceiling above the parking stall or on a nearby MURB structural column so that cabling power loss is minimized for charging the parked electric vehicle in the specific stall. In the implementation depicted, it is assumed that the charging protocol is for a level 2 charger that utilizes a standard J1772 connector, but it should be realized by one skilled in the art that the system architecture and methodology is also applicable to other EV connection standards.

In each MURP system 300, electric vehicle drivers are assigned specific parking stalls with specific power node modules 202 as in a group A or group B illustrated in FIG. 3. Each power node module in a group may have a different electricity storage capacity as may be designed for the specific MURB and assigned by the MURB manager. Each MURP system 300 may have one or more power node modules 202 in the configuration and one or more designated parking stalls. Each parking stall would include at least one electrical connector 204 (such as a J1772 electrical connector) associated with the power node module 202. MURP subscribers will download a MURP application 108 from a designated online store such as Apple store for IOS smart phones or Google Play for Android phones. The subscribers are likely to have different charging patterns but for initial provisioning of a MURP system 300, it may be assumed that each subscriber is characterized by average national behavioral statistics such as average commute distance and frequency of electric vehicle usage. Some statistics suggest that the average commuter's daily commute is 30 miles each way so the battery capacity of each power node module 202 may be initially prescribed to have a capacity sufficient to provide enough charge for an electric vehicle commute of at least 30 miles in each direction. The evolving technology of batteries and their charge to weight densities are trending towards higher charge density per weight unit so over time it can be expected that the energy storage capacities of the power node modules 202 will increase without a proportional weight increase. This would allow each power node module 202 to provide greater charging volume and higher travel range per charge. Electric Vehicles can be recharged to varying degrees based on the charge state of the electric vehicle's battery and user defined factors such as the user's work schedule. The battery management system 606 in conjunction with the power control unit 602 manages the supply of charging current and voltage to the battery module 608 while it is under load charging an EV and may switch off as necessary to prevent dangerous or undesired power imbalance in the specific MURP system 300 and beyond.

Referring now back to FIG. 6, it is likely that some users of the power node module 202 will require a longer charging session for their connected electric vehicle than others. In this case, the remaining state of charge of each battery module 608 in the associated power node module 202 will likely differ from one power node module to another after each charge of an electric vehicle. The statuses of the power node modules 202 are communicated to the power node master controller 302 by the power node module's power control unit 602 in conjunction with communications module 604. The state of charge or stored energy level of each battery module 608 in each power node module 202 is also communicated throughout the local MURP system 300 and externally to the overall PowerNet system 312 that administers a plurality of MURPs 300 in their respective MURBs.

To account for such situations of above normal charging times for some electric vehicles, a MURB may opt to install supplemental power node modules 202 which store energy that may be used as backup charging stations for electric vehicles that have depleted the battery at their assigned power node module 202. Alternatively, the supplemental power node modules 202 may be used to refill the depleted batteries in power node modules 202 which are used beyond the normal statistical average. Such functionality is effected through the power node master controller 302 of the MURP system 300 which manages the distribution of power within the local MURP system 300 and works in conjunction with the power control units 602 of the supplemental power nodes 202 and the power control units of the charge-depleted power node modules to prioritize delivery of charging power from the power distribution panel 304 to the depleted power node modules 202 according to established protocols. In some instances, the recharging of the depleted battery modules may be augmented by extracting power from other battery modules that have stored energy that are available based on historical data that has been tracked and recorded in PowerNet 312 and which action could be initiated by its artificial intelligence unit 311, or by the system administrator 314 or building management 316. In such instances the power control units 602 in conjunction with the power master controller 302 synchronizes the operation of the associated relays and cross-connect switches 704 to effect the appropriate power flows. The protocols may also be initiated and/or modified by the administrator 314 and building management 316. Various battery replenishment protocols may be implemented in each MURP system 300 installation at the discretion of the host MURB management 316, and such management may also impose specific protocols in administering usage penalties for excess charging. Such MURBs that experience unusual charging anomalies may also opt to require the offending user to remove their electric vehicle to one or more designated parking stalls that contains a supplemental power node module 202 for any supplemental charging that may be required.

Figure 8:
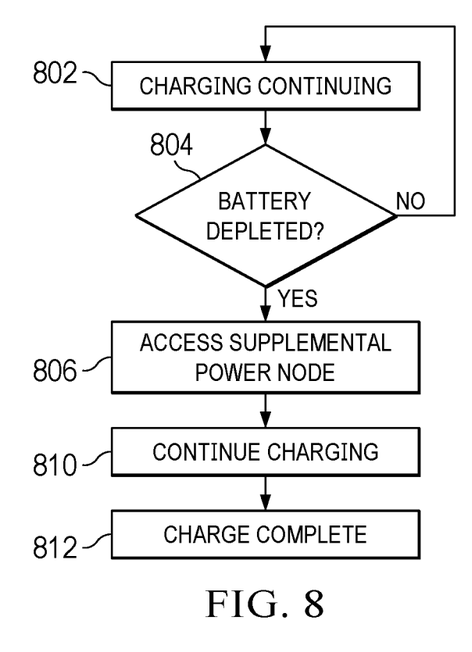
FIG. 8 illustrates a flow diagram of the charge monitoring process for an electric vehicle connected to a power node module.

FIG. 8 illustrates one example of the additional protocols associated with powering of the depleted power node modules 202 from a supplemental power node module. Step 802 determines that the charging of an electric vehicle is continuing and inquiry step 804 will determine if the currently connected power node module 202 has its battery depleted. If not, control returns back to step 802 and the charging process continues. If inquiry step 804 determines that the currently connected battery is depleted, a supplemental power node module is accessed at step 806. Charging continues using the supplemental power node module at step 810 until it is determined that the charging is complete or whether another supplemental power node module needs to be accessed. If another supplemental power node module is required, then step 810 is repeated until the power node 202 is adequately charged as determined at step 812 and the charging process is discontinued. Alternatively, step 812 may be initiated by PowerNet 312 in conjunction with the PCU 602 of the charge-receiving power node module if there is insufficient spare battery energy in the MURP system that can be tapped to continue charging the recipient power node module.

Figure 9:
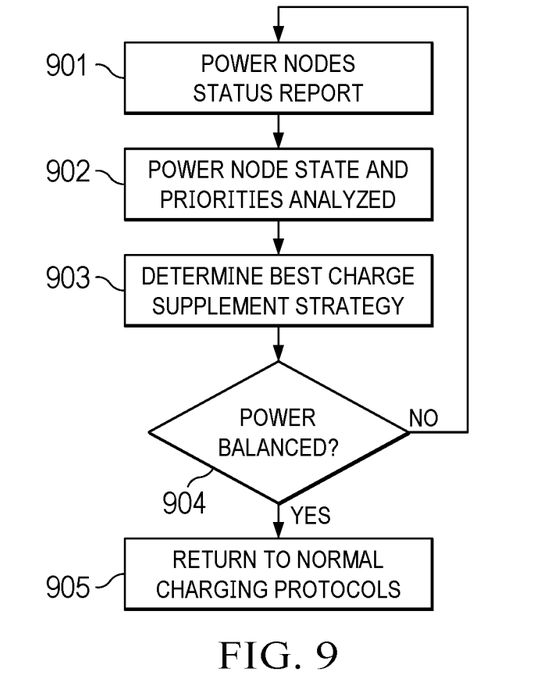
FIG. 9 illustrates a flow diagram of the process for managing battery charge balancing for a multi-node implementation.

FIG. 9 illustrates a flow diagram of the process for managing battery charge states for a multi-node implementation in a MURP system 300. The process begins at step 901 wherein the power master controller 302 of each MURP system 300 receives and reports the individual charge state of the power node modules in the group to PowerNet 312 along with any indications of projected charge state anomalies expected. At step 902, the control center 313 of PowerNet 312 in conjunction with its artificial intelligence unit 311 compares the reported power node modules' charge states with the specific MURP's users' historical EV charging patterns and subscribed services and assesses whether there are potential charging issues that may arise such as may occur when a user's assigned power node module is not sufficiently charged for the expected user's charging time. If an issue is projected, then at step 903 PowerNet 312 may elect to suspend the charging of certain power node modules that are not in need of immediate refreshing of their associated battery modules so that more power may be distributed to other power node modules that are lagging in their charge state. Alternatively, PowerNet 312 may even direct some fully charged power node modules to feed power to the charge-lagging power node modules. Such re-direction is effected by engaging the respective power control units 602 of the selected charge-providing and charge-lagging power node modules. When it is determined at step 904 that the charge-lagging power node modules are caught up in its charge state then PowerNet 312 resumes normal charging protocols at step 905. Otherwise, the routine is repeated with continuous assessment of power node modules' charge status at step 901 and so forth.

The present system has been described with respect to its implementation using an electrical charging infrastructure for electric vehicles. It should be realized that the system may be equally applicable to other charging protocols and power ratings and standards, and even other zero emission (meaning zero carbon emission) vehicles such as hydrogen powered vehicles. In addition, the implementation of the system described is not restricted to building structures with limited power distribution infrastructure as EV charging effectiveness may be enhanced by implementing such systems even in MURBs with adequate preexisting power infrastructures. Such a system could also find utility in implementations where physical wiring infrastructures may be infeasible such as in marinas when electrically powered boats become available and need charging. Marine versions of the MURP system 300 could be deployed with power node modules on floating pontoons which nodes may be regularly recharged externally by roving charging vessels equipped with battery banks of stored energy, or onboard solar generators and wind turbines. Such pontoons may also be independently powered by wind turbines or other appropriate clean energy generators.

This application can be incorporated with the disclosure of U.S. Pat. No. 10,960,782, filed Feb. 19, 2019, entitled METHOD AND DEVICE FOR CONVERTING STAND-ALONE EV CHARGING STATIONS INTO INTELLIGENT STATIONS WITH REMOTE COMMUNICATIONS CONNECTIVITY AND CONTROL, U.S. Pat. No. 10,857,902, filed Apr. 3, 2017 entitled AUTOMATED SYSTEM FOR MANAGING AND PROVIDING A NETWORK OF CHARGING STATIONS, the Continuation Application for METHOD AND DEVICE FOR CONVERTING STAND-ALONE EV CHARGING STATIONS INTO INTELLIGENT STATIONS WITH REMOTE COMMUNICATIONS CONNECTIVITY AND CONTROL which was filed in the United States Patent and Trademark Office ("PTO") on Mar. 16, 2021, and which was assigned Ser. No. 17/203,278, U.S. patent application Ser. No. 16/412,118, filed May 14, 2019, entitled MOBILE ELECTRIC VEHICLE CHARGING STATION SYSTEM and U.S. patent application Ser. No. 17/105,485, filed Nov. 25, 2020, entitled AUTOMATED SYSTEM FOR MANAGING AND PROVIDING A NETWORK OF CHARGING STATIONS, U.S. patent application Ser. No. 17/104,123, filed Nov. 25, 2020, entitled A UNIVERSAL AUTOMATED SYSTEM FOR IDENTIFYING, REGISTERING AND VERIFYING THE EXISTENCE, LOCATION AND CHARACTERISTICS OF ELECTRIC AND OTHER POWER OUTLETS BY RANDOM USERS AND FOR RETRIEVAL AND UTILIZATION OF SUCH PARAMETRIC DATA AND OUTLETS BY ALL USERS, U.S. patent application No. 17/533,706, filed Nov. 23, 2021, entitled METHODS AND DEVICES FOR WIRELESS AND LOCAL CONTROL OF THE TWO-WAY FLOW OF ELECTRICAL POWER BETWEEN ELECTRIC VEHICLES, BETWEEN EVS AND ELECTRICAL VEHICLE SUPPLY EQUIPMENT (S), AND BETWEEN THE EVSE(S) AND THE ELECTRICITY GRID, U.S. patent application Ser. No. 17/857,840, filed Jul. 5, 2022, entitled MOBILE ELECTRIC VEHICLE CHARGING STATION SYSTEM each of which are incorporated herein by reference in their entirety.

It will be appreciated by those skilled in the art having the benefit of this disclosure that this system and method for providing distributed on-demand elevated power in low power infrastructures provides a manner for implementing electric vehicle charging infrastructure in buildings that were not designed and provisioned with the necessary infrastructure for charging electric vehicles at the time of original construction. It should be understood that the drawings and detailed description herein are to be regarded in an illustrative rather than a restrictive manner and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A power distribution system for charging electric vehicles, comprising:
    a plurality of power node modules each including a battery module for storing electrical energy, the plurality of power node modules connected to an electrical grid at a preexisting load point for receiving an electrical current at a first power level, each of the plurality of power node modules charging the associated battery module responsive to the received electrical current at the first power level, the plurality of power node modules generating a charging current at a second power level greater than the first power level for charging a connected electric vehicle using the stored electrical energy of the associated battery module responsive to received charging control signals;
    at least one charger connector connected to each of the plurality of power node modules for connecting the connected electric vehicle to receive the charging current; and
    a power node module master controller for generating the charging control signals to initiate providing source power to the plurality of power node modules and to initiate charging of the connected electric vehicles by the plurality of power node modules.

2. The system of claim 1, wherein the plurality of power node modules each further comprise:

an input/output module for providing external connections to a power node module;

a power control unit for controlling power flow between the plurality of power node modules, between the plurality of power node modules and the power node module master controller and between the power node module and an external power source/storage;

a communications module for enabling communications with the power node module from external sources;

a battery management module associated with the battery module in the power node module for monitoring, controlling and optimizing charging of the battery module; and a power conversion module for converting the received electrical current from the power node module master controller or external power source/storage into an AC or DC current depending on load requirements.

3. The system of claim 2, wherein the input/output module provides for a connection for an external power source/storage for receiving current at a first power level and for transferring power from the power node module to the external power source/storage.

4. The system of claim 2, wherein the power conversion module is removably connectable to the power node module.

5. The system of claim 4, wherein the power node module master controller further comprises a supplemental input/output (SIO) port for providing electricity to an external load or storage and to receive electricity from an external generator or storage.

6. The system of claim 2 further including an output power inverter for providing the charging current at the second power level, the output power inverter being removably connectable to the power node module.

7. The system of claim 2, wherein the power control unit and the power node master controller continuously monitor recharging and control based on rated capacity of existing cabling infrastructure.

8. The system of claim 1, wherein an external source charges a power node module at a selected one of a Level 2 (240V AC) or Level 3 (DC) power.

9. The system of claim 1, wherein the power node module master controller further comprises reverse metering circuitry for tracking electricity provided from any of the plurality of power node modules to another power consuming entity.

10. The system of claim 1 further comprising at least one user application for controlling generation of the charging control signals by the power node module master controller, the at least one user application communicating with the power node module master controller via a network communications cloud which consists of both wired and wireless mediums and protocols.

11. The system of claim 1, wherein the power node module master controller and the power control unit of a power node module enables bidirectional transfer of power to/from the plurality of power node modules.

12. The system of claim 1, wherein each of the plurality of power node modules charges the associated battery module responsive to a second received electric current at the first power level from another power node module.

13. The system of claim 1, wherein at least one of the plurality of power node modules is portable and can be transported to a desired location.

14. The system of claim 1, wherein the plurality of power node modules may receive the electrical current at the first power level via at least one of wired connectors or wirelessly through induction.

15. The system of claim 1, wherein the plurality of power node modules exchange power with each other under control of power control units receiving external control signals.

16. The system of claim 1, wherein the preexisting load point comprises a wall outlet.

17. The system of claim 1, wherein electrical current at the first power level comprises a 120 V signal and the charging current at the second power level comprises a 240 V signal.

18. The system of claim 1, wherein the plurality of power node modules are each individually chargeable in different configurations based on a user profile of a user associated with a power node module.

19. The system of claim 1, wherein the plurality of power node modules can be fast charged using a direct current signal.

20. The system of claim 1, wherein the power node module master controller responsive to the charging control signals enables the plurality of power node modules to be grouped together at a plurality of levels as connected to the electrical grid.

21. An apparatus for implementing a power distribution system for electric vehicles charging comprising:

a battery for storing electrical energy;

a power node module connected to an electrical grid at a preexisting load point for receiving an electric current at a first power level, the power node module charging the battery responsive to the received electric current at the first power level, the power node module generating a charging current at a second power level greater than the first power level for charging a connected electric vehicle using the stored electrical energy of the battery responsive to a received charging control signal from a power node module master controller; and at least one charger connector connected to the power node module for connecting the connected electric vehicle to receive the charging current.

22. The apparatus of claim 21, wherein the power node module comprises:

an input/output module for providing external connections to the power node module;

a power control unit for controlling power flow between a first power node module and a second power node module and between the first power node module and an external power source/storage unit;

a communications module for enabling communications with the power node module from external sources;

a battery management module associated with the battery for controlling and charging of the battery within permitted current and voltage conditions and to monitor and report a charging state of the battery; and a power conversion module for converting the received electric current into an AC or DC current depending on load requirements.

23. The apparatus of claim 22, wherein the input/output module provides for a connection for an external power source/storage for providing the charging current to the electric vehicle.

24. The apparatus of claim 21 further comprising reverse metering circuitry for tracking electricity provided from the power node module to another power consuming entity.

25. The apparatus of claim 21, wherein the power node module further includes a battery management system associated therewith for monitoring and charging the battery associated with the power node module responsive to an electrical control signal provided to the battery management system.

26. The apparatus of claim 21 further comprising at least one user application for controlling generation of the charging control signals to the power node module, the at least one user application communicating with the power node module via a network protocol.

27. The apparatus of claim 21, wherein the power node module may be installed in a home by plugging into an electrical socket.

28. An apparatus for implementing a power distribution system for electric vehicles charging comprising:
   a battery for storing electrical energy;
   a power node module connected to an electrical grid at a preexisting load point for receiving an electric current at a first power level, the power node module charging the battery responsive to the received electric current at the first power level, the power node module generating a charging current at a second power level greater than the first power level for charging a connected electric vehicle using the stored electrical energy of the battery responsive to received charging control signal;
   at least one charger connector connected to the power node module for connecting the connected electric vehicle to receive the charging current; and
   a power node module master controller for generating the charging control signals to initiate providing source power to the power node module and to initiate charging of the connected electric vehicle by the power node module.

* * * * *